(12) United States Patent
Hashimoto (10) Patent No.: US 7,710,684 B2
(45) Date of Patent: May 4, 2010

(54) LIBRARY APPARATUS WITH CARTRIDGE TYPE SENSOR

(75) Inventor: Koujiro Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 661 days.

(21) Appl. No.: 11/504,639

(22) Filed: Aug. 16, 2006

(65) Prior Publication Data

US 2007/0165321 A1    Jul. 19, 2007

(30) Foreign Application Priority Data

Jan. 16, 2006    (JP)    ............................. 2006-007981

(51) Int. Cl.
*G11B 15/60* (2006.01)
*G11B 17/22* (2006.01)

(52) U.S. Cl. .................. 360/92.1; 369/273; 369/30.38

(58) Field of Classification Search ................ 360/92.1, 360/132, 133; 369/30.38, 30.4, 273; 720/725
See application file for complete search history.

(56) References Cited

U.S. PATENT DOCUMENTS

| | | | |
|---|---|---|---|
| 6,717,766 B2 | 4/2004 | Hashimoto et al. | |
| 6,826,004 B2 | 11/2004 | Albrecht et al. | |
| 7,111,781 B2 | 9/2006 | Fletcher | |

FOREIGN PATENT DOCUMENTS

| | | | |
|---|---|---|---|
| JP | 05120712 A | * | 5/1993 |
| JP | 8-212649 | | 8/1996 |
| JP | 10-162461 | | 6/1998 |
| JP | 2000-339817 | | 12/2000 |
| JP | 2002-334556 | | 11/2002 |
| JP | 2003059143 A | * | 2/2003 |
| JP | 2004-525476 | | 8/2004 |
| JP | 2005-108413 | | 4/2005 |

OTHER PUBLICATIONS

English-Machine translation of JP 10-162461 A, to Fukuda, published on Jun. 19, 1998.*
Communication from the Japanese Patent Office dated Aug. 17, 2009 in the related Japanese patent application No. 2006-0077981.

* cited by examiner

*Primary Examiner*—William J Klimowicz
(74) *Attorney, Agent, or Firm*—Staas & Halsey LLP (57) ABSTRACT

A library apparatus includes a cartridge type sensor and a robot. The cartridge type sensor includes a cartridge having the same shape as that of each recording medium stored in a cell, an optical reader for reading a medium identification code, and a medium detector for detecting the presence or absence of a recording medium in a target cell. The optical reader and the medium detector are disposed in the cartridge of the cartridge type sensor. The robot picks up the cartridge type sensor from a cell which stores the cartridge type sensor and positions the cartridge type sensor at a predetermined location in the library apparatus while holding the cartridge type sensor.

1 Claim, 13 Drawing Sheets

DEAD SPACE

DEAD SPACE

FIG. 13B   PRIOR ART

DEAD SPACE

LIBRARY APPARATUS WITH CARTRIDGE TYPE SENSOR

BACKGROUND OF THE INVENTION

1. Field of the Invention

The present invention relates to library apparatuses, and in particular, relates to a library apparatus including a cartridge type sensor, the sensor, and a method for positioning the sensor at a predetermined location in the library apparatus. The cartridge type sensor includes a cartridge having the same shape as that of each recording medium to be stored in a cell, an optical reader, and a medium detector, the optical reader and the medium detector being arranged in the cartridge. In the library apparatus, the cartridge type sensor is stored in any of cells for storage of recording media. The sensor is removed from the cell and is then positioned in order to read a medium identification code and/or detect the presence or absence of a recording medium in a target cell while being held.

2. Description of the Related Art

With the recent increase in capacity of a hard disk, the loss of data has more serious effects beyond an individual or a company.

In case data is lost, therefore, backup of systems is of the most importance to computer operation. In many cases, a library apparatus for magnetic tapes or optical disks, serving as recording media, is used for backup of data.

In the library apparatus, magnetic tapes or optical disks, each of which is housed in a cartridge, are stored in respective cells of a cabinet. A robot provided for the library apparatus removes a target recording medium from a cell, carries the medium, and inserts it into a drive for recording/playback.

In addition, the robot ejects the recording medium from the drive, carries the medium, and returns it into the original cell.

Generally, a library apparatus for magnetic tapes stores several to hundreds of magnetic tapes and includes one or more drives and one or two robots.

A conventional library apparatus will now be described in more detail.

Figure 8A:
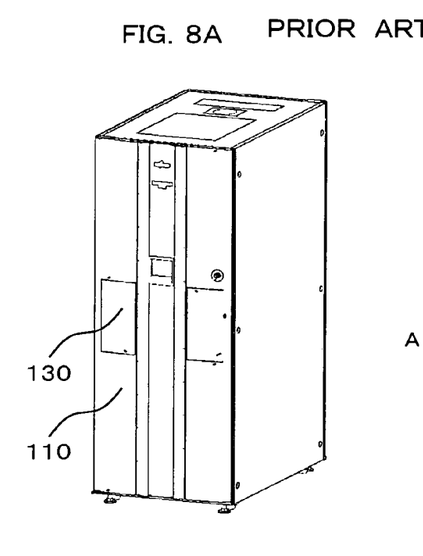
FIGS. 8A to 8C are diagrams showing a conventional library apparatus, FIGS. 8A and 8B each showing the appearance of the apparatus, FIG. 8C showing the cross section thereof.
Figure 8B:
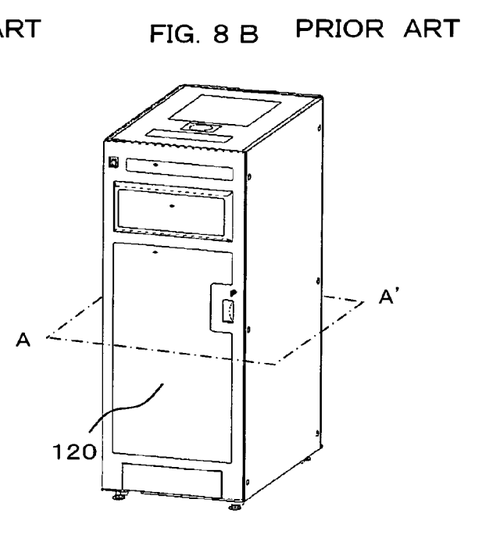
Figure 8C:
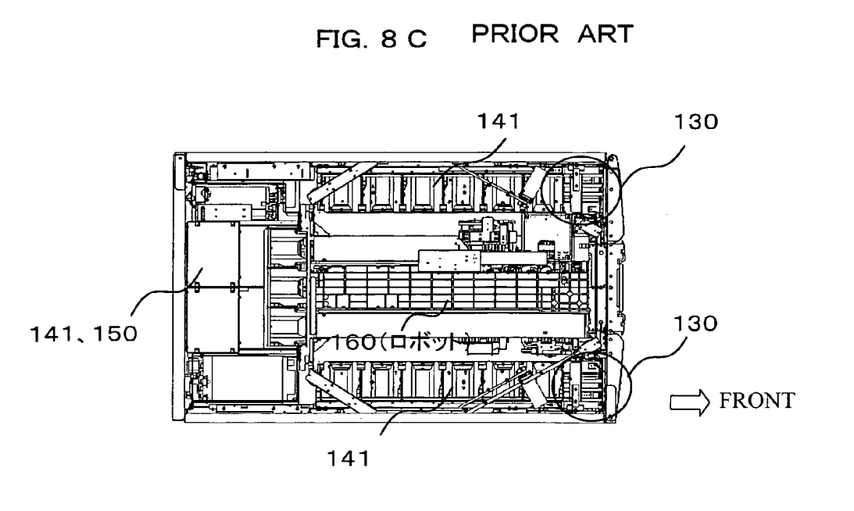

FIGS. 8A to 8C are diagrams explaining a conventional library apparatus. FIG. 8A is a perspective view of the library apparatus as viewed from the front side. FIG. 8B is a perspective view of the library apparatus as viewed from the rear side. The library apparatus has a front door 110 and a rear door 120 and also includes cells, a robot, and a drive. The front door 110 includes an insertion-ejection mechanism 130, through which a recording medium is inserted or ejected. FIG. 8C is a cross-sectional view at the line A-A' of FIG. 8B. In the library apparatus, a U-shaped cabinet 141 including a plurality of cells 140 is arranged, i.e., segments of the cabinet 141 are arranged on left, right, and back walls, respectively. In each segment, shelves are arranged vertically. A drive 150 is disposed under the lowermost shelf of the back segment of the cabinet 141. The insertion-ejection mechanism 130 is arranged on the rear of the front door 110. A robot 160 is located in substantially the middle of the apparatus.

Figure 9A:
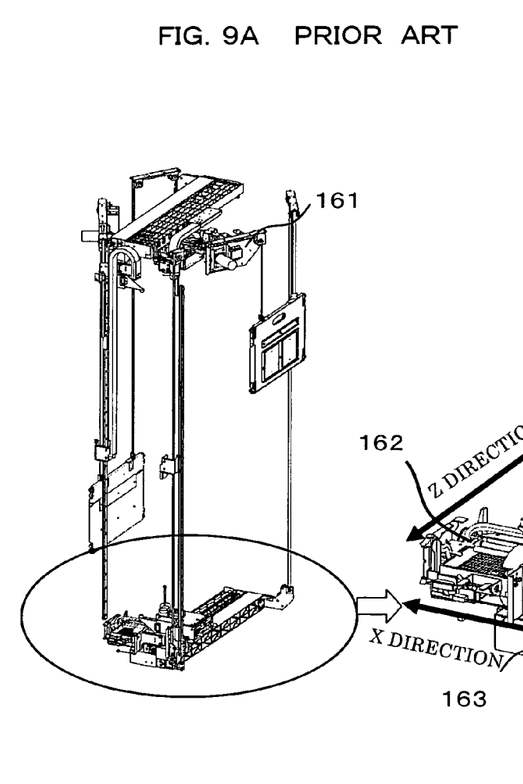
FIGS. 9A and 9B showing a robot provided for the conventional library apparatus.
Figure 9B:
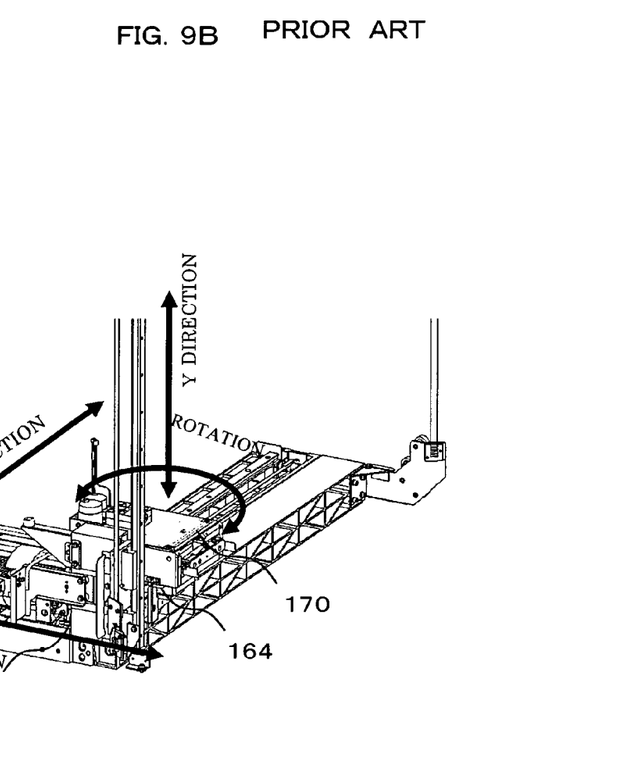

FIGS. 9A and 9B are diagrams explaining the structure of the robot 160. FIG. 9A shows the whole appearance of the robot and a Y mechanism 161. FIG. 9B shows lower part of the robot 160 and illustrates an X mechanism 162, a Z mechanism 163, and a rotating mechanism 164. FIG. 9B also illustrates a hand 170 for removal and storage of a recording medium from/into a cell 140 and for insertion and ejection thereof into/from the drive 150. The X to Z mechanisms and the rotating mechanism are configured to position the hand 170 at a target cell 140, the drive 150, or the insertion-ejection mechanism 130. The Y mechanism 161 is vertically movable. The X mechanism 162 and the Z mechanism 163 are horizontally movable. The rotating mechanism 164 is horizontally rotatable.

Figure 10:
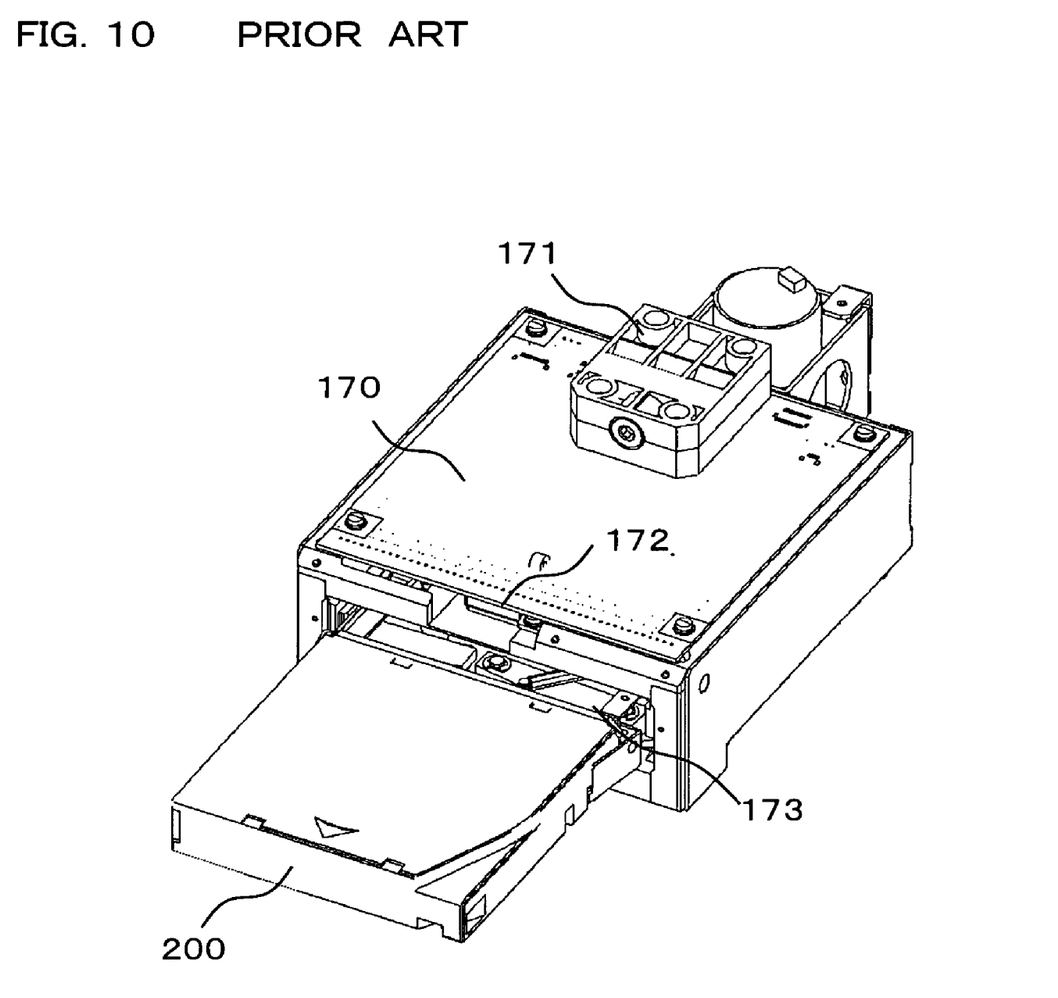
FIG. 10 is a perspective of a hand provided for the conventional library apparatus.

FIG. 10 is a diagram explaining the hand 170. The hand 170 includes a picker 173, a CCD camera (or a laser barcode reader) 171, a medium detector 172, and a holding mechanism (not shown). The picker 173 picks up a recording medium 200 from a cell 140. The CCD camera reads a medium identification barcode applied on the recording medium 200. The medium detector 172 detects whether the recording medium 200 is stored in the cell 140. The holding mechanism holds the recording medium 200 picked up by the picker 173.

Figure 11:
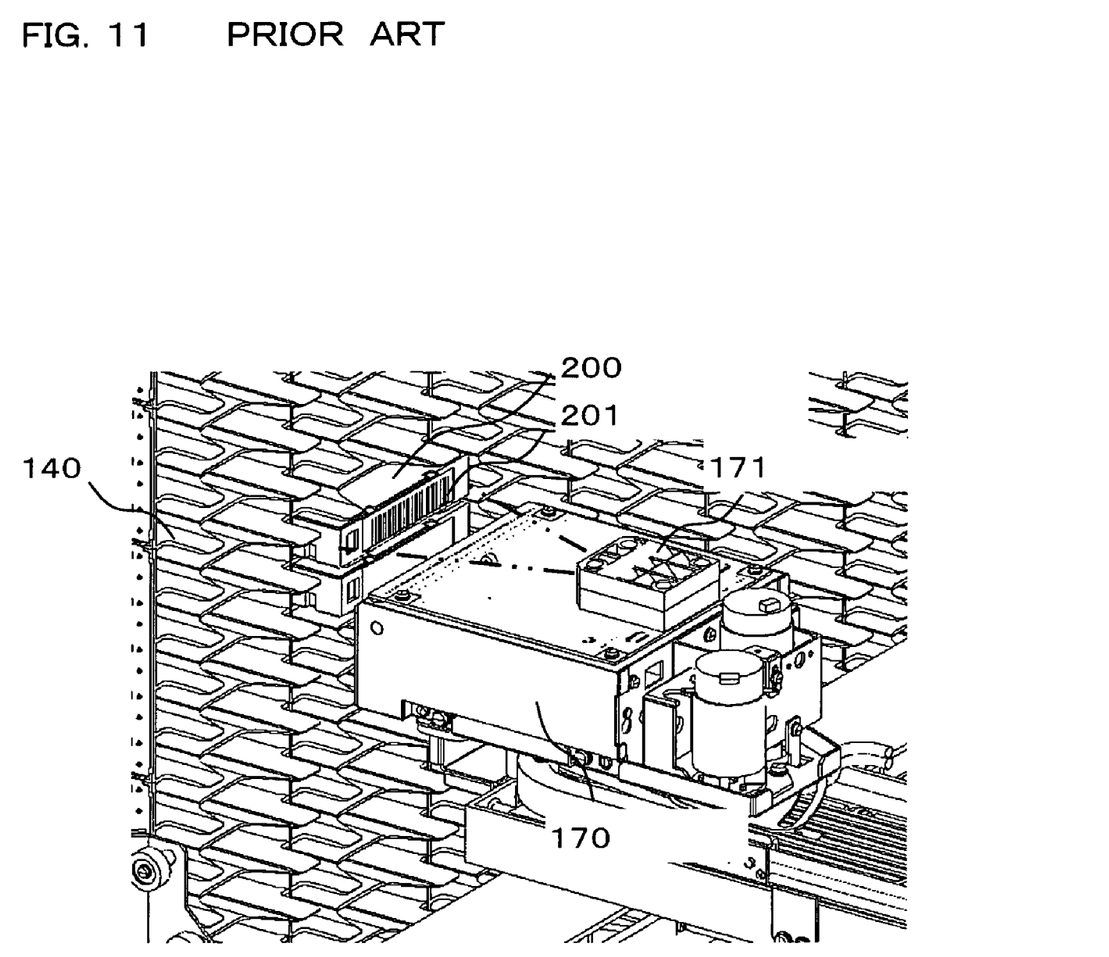
FIG. 11 is a diagram explaining an example of barcode reading in the conventional library apparatus.

FIG. 11 is a diagram explaining barcode reading.

For instance, when the library apparatus is turned on after maintenance, in order to check whether a recording medium has accidentally been ejected from or inserted into the apparatus during maintenance, the medium detector 172 detects whether each cell 140 stores a recording medium 200 in the library apparatus upon power on and the CCD camera 171 reads a barcode 201 applied on each recording medium 200, thus controlling the storage of media in the library apparatus. In a typical library apparatus capable of storing several hundreds of recording media, the medium detector 172 and the CCD camera 171 are mounted on the hand 170 in order to reduce the time required for checking upon power on.

Figure 12:
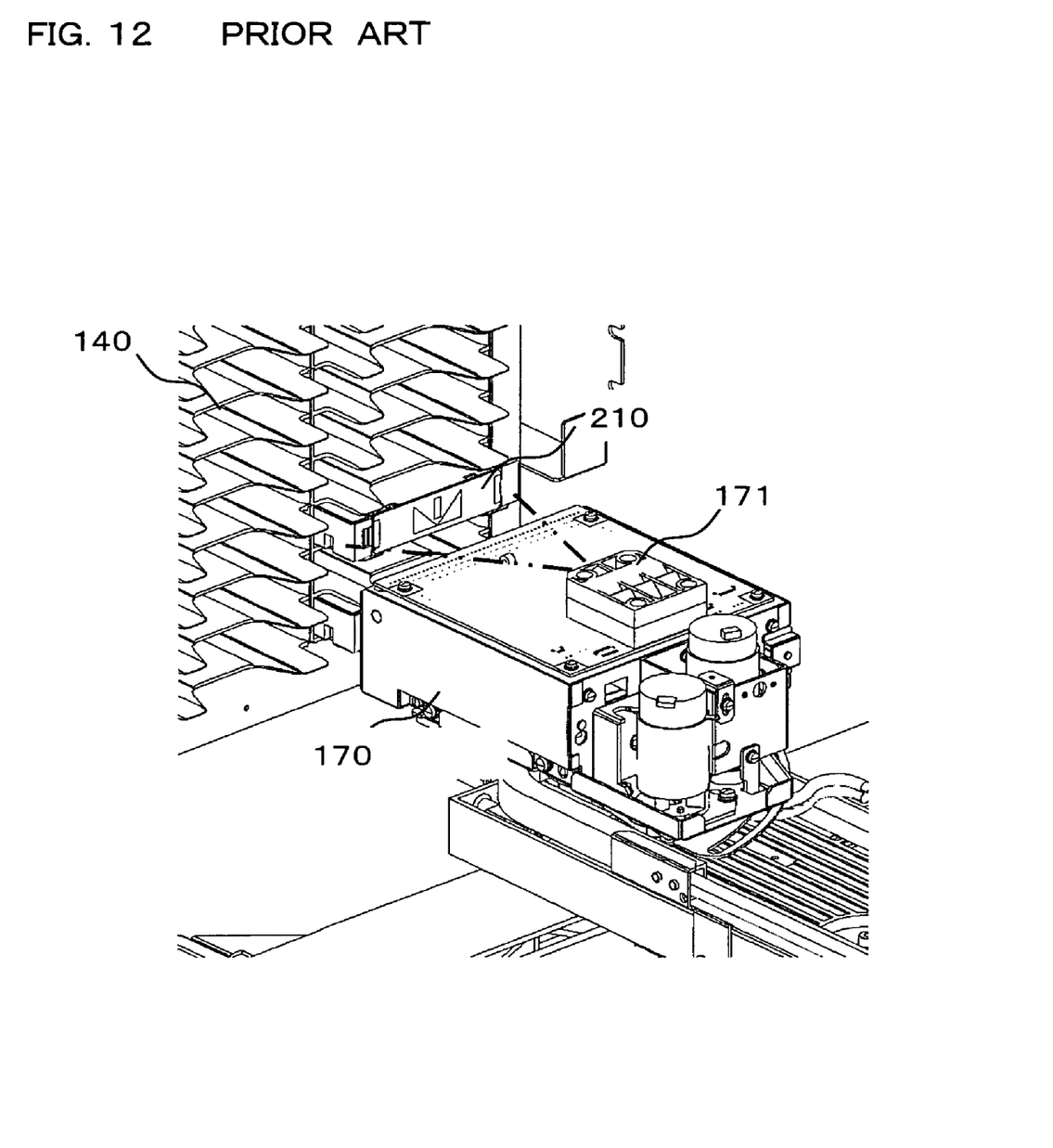
FIG. 12 is a diagram explaining an example of flag reading in the conventional library apparatus.

FIG. 12 is a diagram explaining detection of a mark (hereinafter, referred to as a flag) for position correction. The robot 160 uses a flag in order to ensure the accuracy of positioning to a target cell 140 or the drive 150. FIG. 12 illustrates the robot 160 which reads a flag applied on a recording medium cartridge stored in a cell. Flags are also applied on predetermined positions in, e.g., frames of the respective cells 140, the drive 150, and the insertion-ejection mechanism 130. The CCD camera 171 is used to read the flags. In the use of the CCD camera 171, barcode reading and flag reading are performed by the single camera.

Related arts include another type of library apparatus and a method for the same. This conventional library apparatus includes a cartridge-shaped unit for internal monitoring of the library apparatus. The cartridge-shaped unit includes a cartridge having the same shape as that of each recording medium and further includes therein a camera, a transmitter, and a battery. A receiver and a monitor are arranged outside the library apparatus. According to this conventional method, the camera captures an image of the internal state of the library apparatus to output video signals, the transmitter transmits the video signals, the receiver receives the signals, and the monitor displays the received signals.

The purpose of this method is to confirm the internal state of the library apparatus without opening a door under abnormal conditions, e.g., when a recording medium cartridge falls in the library apparatus.

As described above, in the foregoing conventional apparatus, the CCD camera 171 and the medium detector 172 are mounted on the top or bottom of the hand 170, alternatively, the left or right side thereof. In addition, the CCD camera 171 has to be accurately installed on the hand 170 in order to ensure the positioning accuracy of the robot 160. The above-described arrangement causes a large dead space in the library apparatus.

Figure 13A:
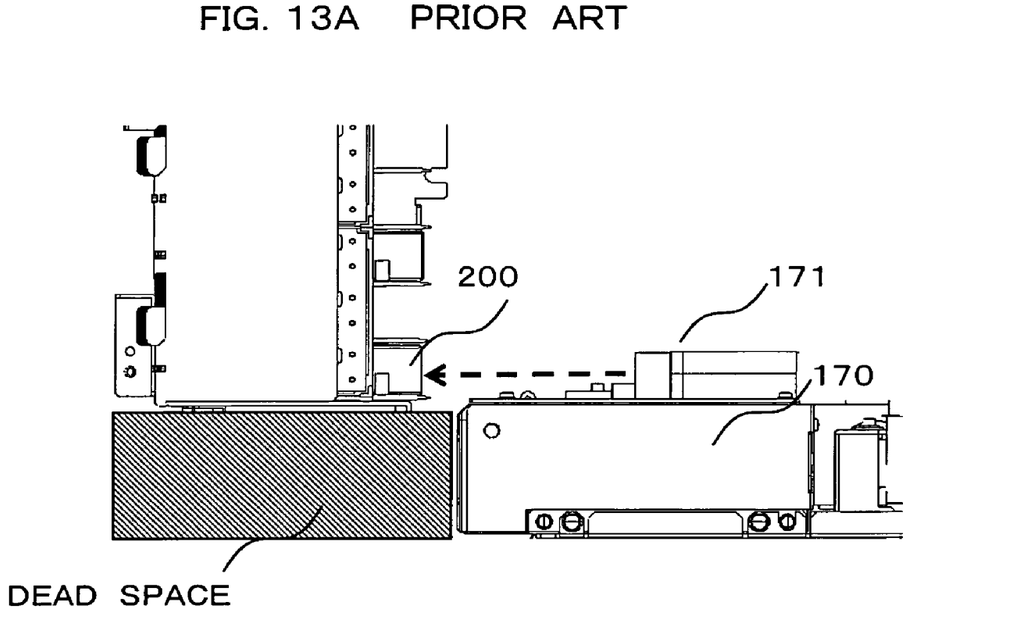
FIGS. 13A and 13B each show a dead space in the conventional library apparatus.

FIGS. 13A and 13B are diagrams explaining examples of a dead space. Referring to FIG. 13A, in a case where the CCD camera 171 and the medium detector 172 are mounted on the top of the hand 170, the CCD camera 171 has to be opposed to a barcode 201 applied on a recording medium 200 stored in a lowermost cell 140 to read the barcode 201. Unfortunately, a large dead space is created as shown in the figure. Disadvantageously, the dead space leads to a reduction in the number of stored recording media.

Figure 13B:
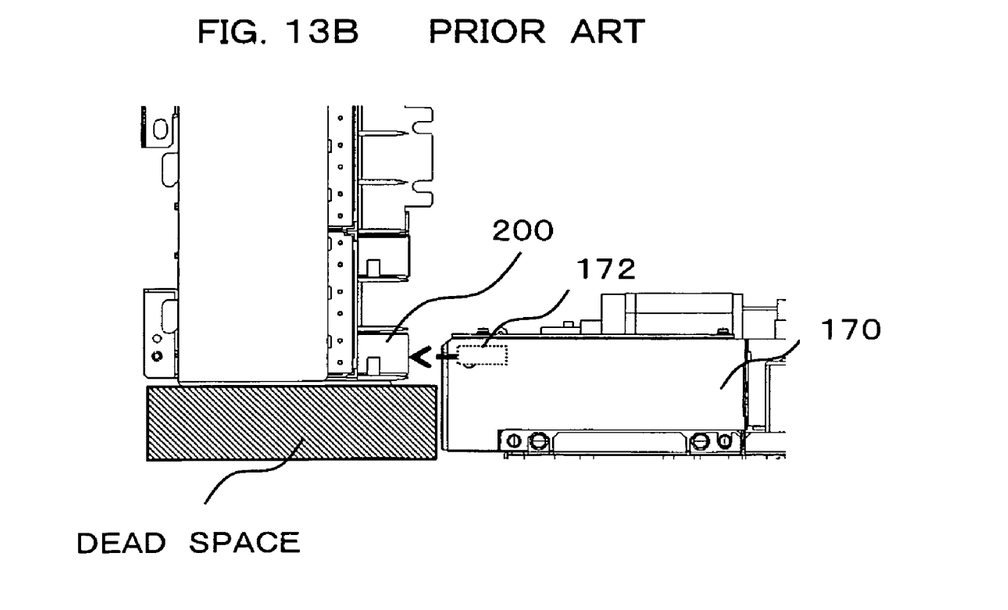

FIG. 13B illustrates detection of the presence or absence of a recording medium 200. Though smaller than that in reading the barcode 201, a dead space is created in this case. When two robots are mounted for redundant arrangement of robots, two CCD cameras 171 and two medium detectors 172 are needed. This results in an increase in cost.

The other conventional method has an advantage that abnormal conditions can be observed without opening the door because the camera arranged in the cartridge-shaped unit captures an image of the internal state of the apparatus.

However, the conventional method does not intend to reduce a dead space. In addition, the method does not intend to reduce the cost of a library apparatus with two robots.

According to the present invention, it is an object to provide a library apparatus capable of reducing the above-described dead space and including one CCD camera and one medium detector when two robots are arranged.

SUMMARY OF THE INVENTION

According to an aspect of the present invention, there is provided a library apparatus capable of reading a recording-medium identification code and detecting the presence or absence of a recording medium using a cartridge type sensor.

According to this aspect, the apparatus includes a controller, a cartridge type sensor, and at least one robot. The controller controls the robot. The cartridge type sensor includes a cartridge, an optical reader, and a medium detector, the cartridge having the same shape as that of each recording medium to be stored in a cell, the optical reader and the medium detector being arranged in the cartridge. The optical reader reads a medium identification code. The medium detector detects the presence or absence of a recording medium in a target cell.

On the basis of an instruction from the controller, the robot picks up the cartridge type sensor from a cell which stores the sensor and positions the sensor at a predetermined location in the library apparatus while holding the sensor.

The robot positions the sensor at a predetermined location in front of a target cell in order to detect the presence or absence of a recording medium in the cell, alternatively, read an identification code, e.g., a barcode applied on a recording medium stored in the cell.

According to this aspect, in the use of the cartridge type sensor, while the sensor is positioned at the same level as that of a recording medium, an identification code applied on the recording medium can be read, alternatively, the presence or absence of a recording medium can be detected. Advantageously, a dead space in the library apparatus can be reduced. In addition, when the library apparatus includes two robots, one cartridge type sensor can realize the same functions. Advantageously, the library apparatus can be realized with low cost.

DESCRIPTION OF THE PREFERRED EMBODIMENTS

A library apparatus according to an embodiment of the present invention will now be described with reference to FIGS. 1 to 7.

Figure 1:
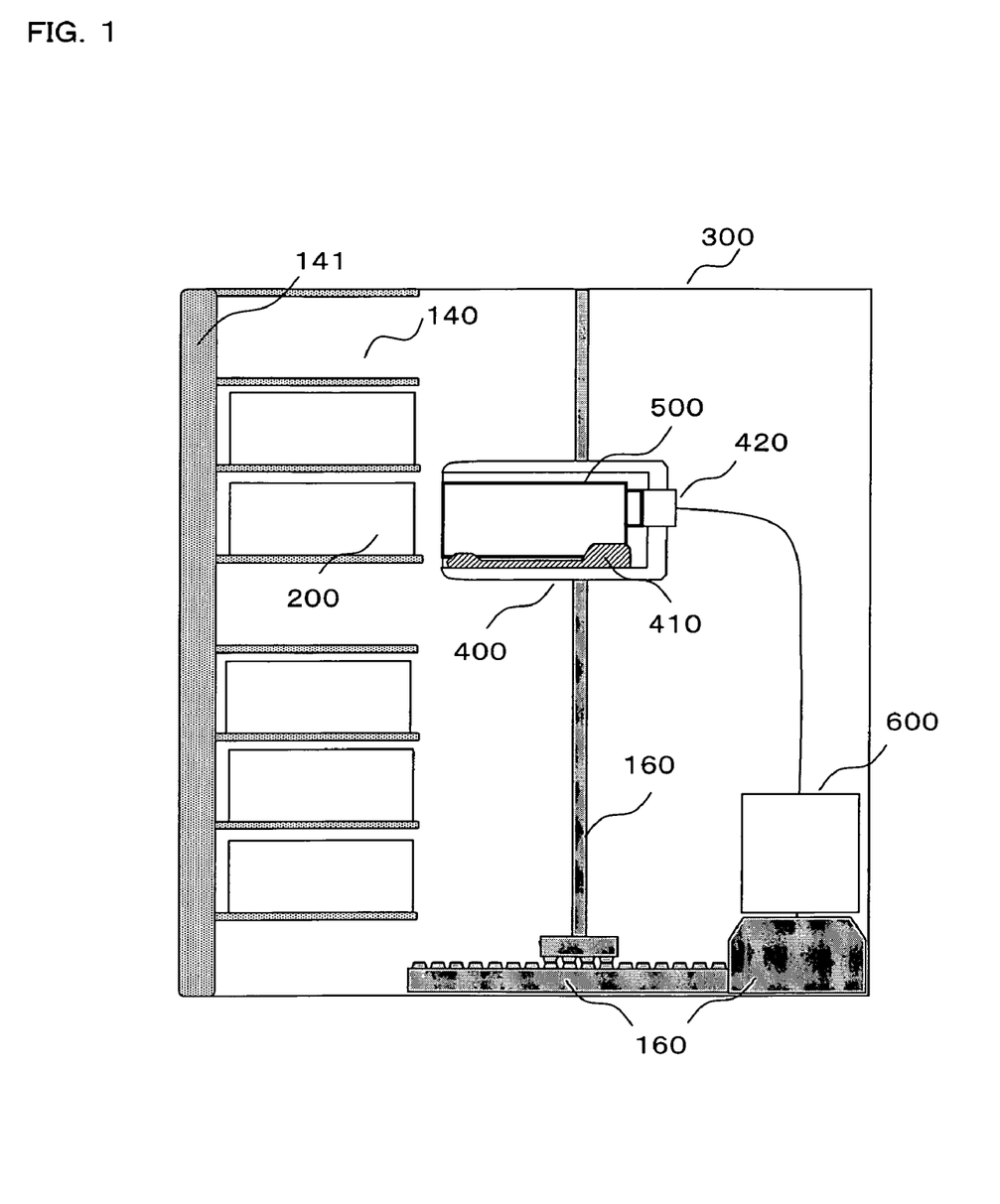
FIG. 1 is a diagram of a library apparatus according to an embodiment of the present invention.

First, the structure of the library apparatus according to the present embodiment will now be described with reference to FIG. 1. Referring to FIG. 1, a library apparatus 300 is broadly divided into three components: a cabinet 141, a robot 160, and a controller 600. The cabinet 141 includes a plurality of cells 140, each serving as a shelf. Each cell 140 is capable of storing a recording medium 200 or a cartridge type sensor 500. The robot 160 includes a Y mechanism 161, an X mechanism 162, a Z mechanism 163, and a rotating mechanism 164, which are not shown. The robot 160 further includes a hand 400, which is constructed as a part of the robot 160. The hand 400 includes a picker 410 and a second connector 420. When the hand 400 is located at a predetermined position (hereinafter, referred to as a storage position) in front of a target cell 140, the picker 410 removes a recording medium 200 or the cartridge type sensor 500 stored in the cell 140, alternatively, the picker 410 stores a recording medium 200 or the cartridge type sensor 500 held by the hand 400 into the cell 140. The second connector 420 is engaged with a first connector provided for the cartridge type sensor 500 when the hand 400 holds the cartridge type sensor 500, which will be described below. The controller 600 controls the robot 160 to position the hand 400 and pick up a recording medium 200 or the cartridge type sensor 500 from a cell 140. The controller 600 also directs the cartridge type sensor 500 to read a flag or a barcode, thus obtaining read information.

Figure 2:
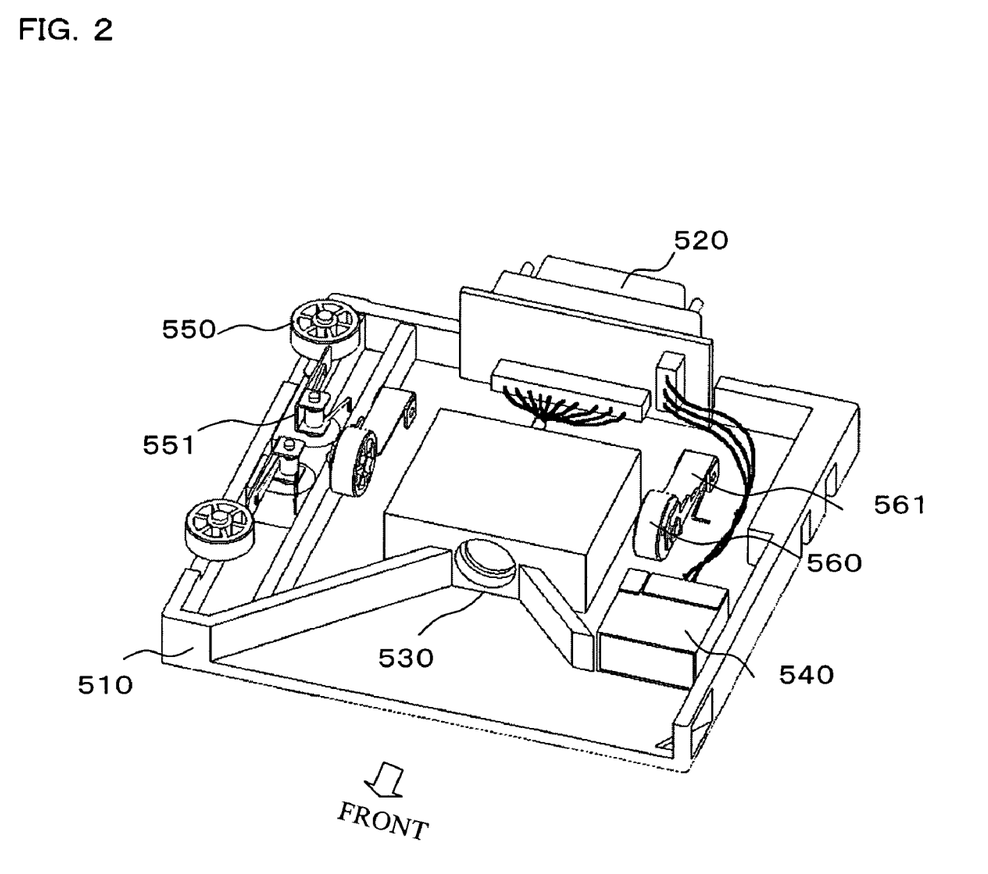
FIG. 2 is a diagram explaining the structure of a cartridge type sensor according to the embodiment of the present invention.
Figure 3:
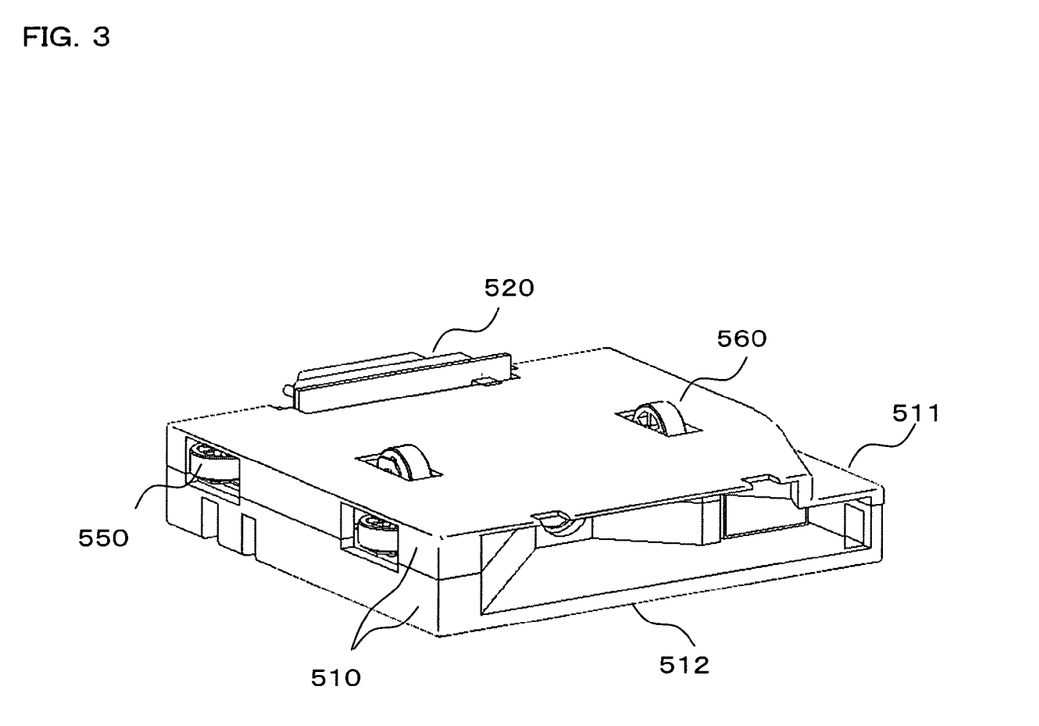
FIG. 3 shows the appearance of the sensor.

FIGS. 2 and 3 are diagrams explaining the structure of the cartridge type sensor 500. FIG. 2 is a perspective view of the sensor 500 with the top cover of a cartridge 510 off. FIG. 3 illustrates the appearance of the cartridge type sensor 500. The cartridge 510 has the same shape as that of a cartridge for each recording medium 200.

Referring to FIG. 2, the cartridge type sensor 500 includes the cartridge 510, an optical reader 530, and a medium detector 540, i.e., the optical reader 530 and the medium sensor 540 are arranged in the cartridge 510. The optical reader 530 and the medium detector 540 are electrically connected to a first connector 520. Two rollers 550 are arranged in the left side surface of the cartridge 510. Elastic members 551 press the respective rollers 550 such that the rollers 550 partially protrude from the left side surface thereof.

Two rollers 560 are arranged in the upper surface of the cartridge 510 and are pressed by elastic members 561 such that the rollers 560 partially protrude from the upper surface thereof.

The states of the rollers 550 and 560 protruding from the cartridge 510 can be confirmed with reference to FIG. 3. Referring to FIG. 3, in the cartridge 510, the right side surface (opposite to the surface from which the rollers 550 protrude) and the lower surface (opposite to the surface from which the rollers 560 protrude) are set to first reference faces 511 and 512, respectively.

Again referring to FIG. 2, specifically, the optical reader 530 includes a CCD camera and the medium detector 540 includes a reflection type photoelectric sensor. Accordingly, the front end of the cartridge 510 is closed in order to provide an optical path.

Figure 4:
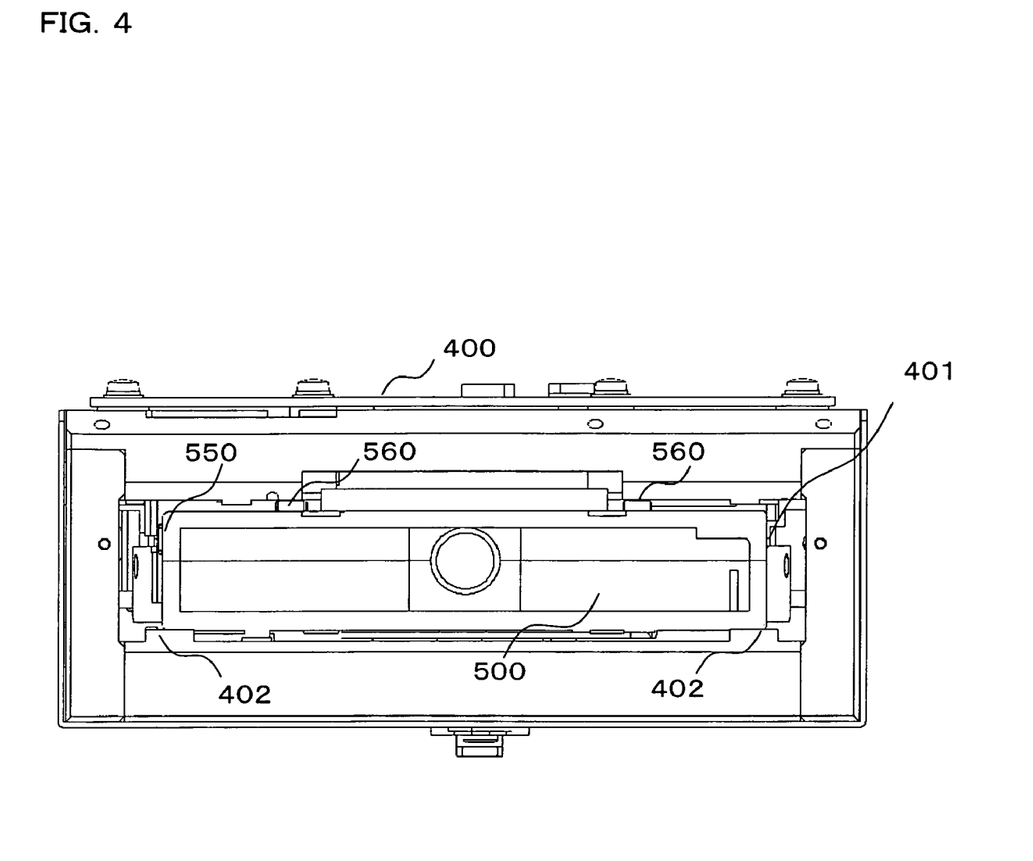
FIG. 4 is a diagram of the sensor held by a hand according to the embodiment of the present invention.

The state of the cartridge type sensor 500 held by the hand 400 will now be described with reference to FIG. 4. When the picker 410 of the hand 400 picks up the cartridge type sensor 500 from a cell 140, the sensor 500 is received into the hand 400. At that time, the rollers 550 of the cartridge type sensor 500 press the first reference face 511 against a second reference face 401 of the hand 400.

In addition, the rollers 560 press the first reference face 512 against a second reference face 402 of the hand 400. With this arrangement, the cartridge type sensor 500 is accurately held in the hand 400, in which a space including the second reference faces 401 and 402 serves as a holding mechanism.

At that time, the first connector 520 of the cartridge type sensor 500 is engaged with the second connector 420 of the hand 400.

Figure 5:
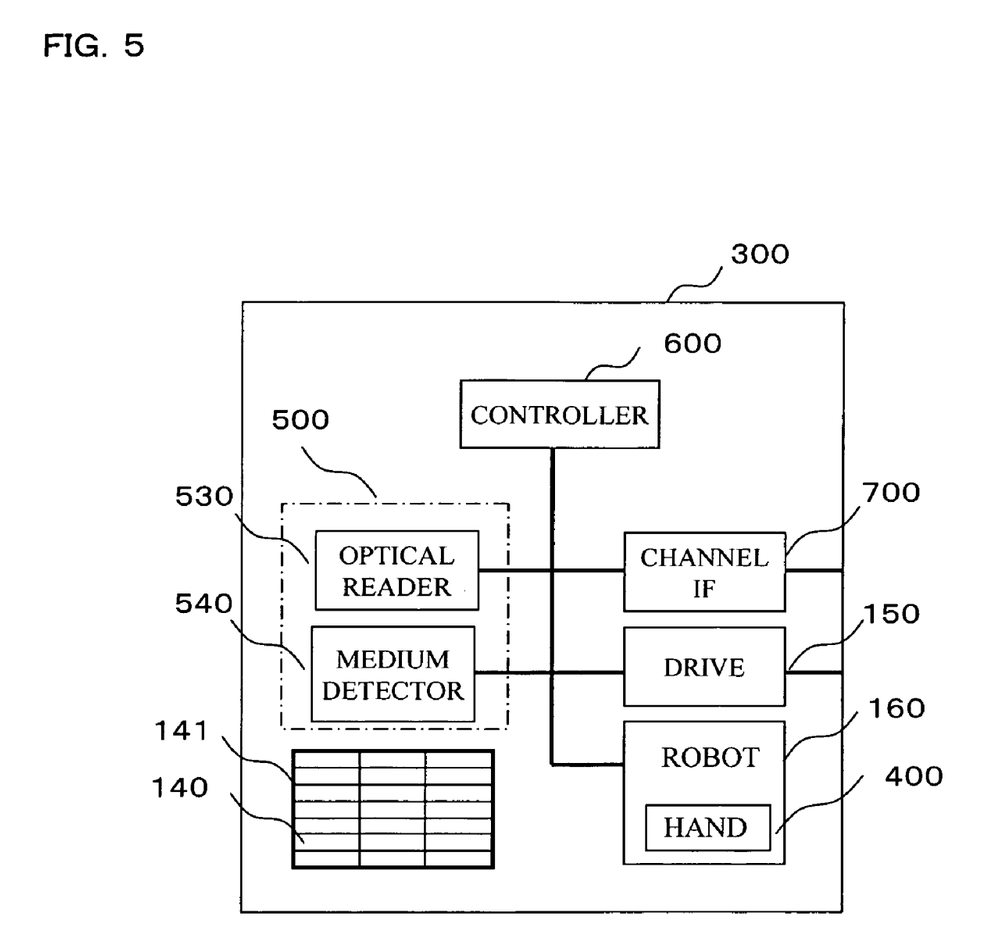
FIG. 5 is a diagram of the structure of the library apparatus according to the embodiment of the present invention.

FIG. 5 shows an example of the structure of the library apparatus 300 in terms of exchanges of information.

The controller 600 is connected to the optical reader 530, the medium detector 540, a channel interface (IF) 700, a drive 150, and the robot 160. The channel IF 700 is also connected to a host computer to receive control information for the robot 160 from the host computer and transmit information, obtained through the optical reader 530 and the medium detector 540, thereto. The drive 150 is also connected to the host computer to receive data to be written to a recording medium 200 or transmit data read therefrom from/to the host computer. The hand 400 is a part of the robot 160 and is controlled in accordance with an instruction output from the controller 600. The optical reader 530 and the medium detector 540 are disposed in the cartridge type sensor 500. Information obtained through the optical reader 530 and the medium detector 540 is transferred through the first connector 520 and the second connector 420 of the hand 400 to the host computer. Each cell 140 is capable of receiving a recording medium 200 or the cartridge type sensor 500.

Figure 6:
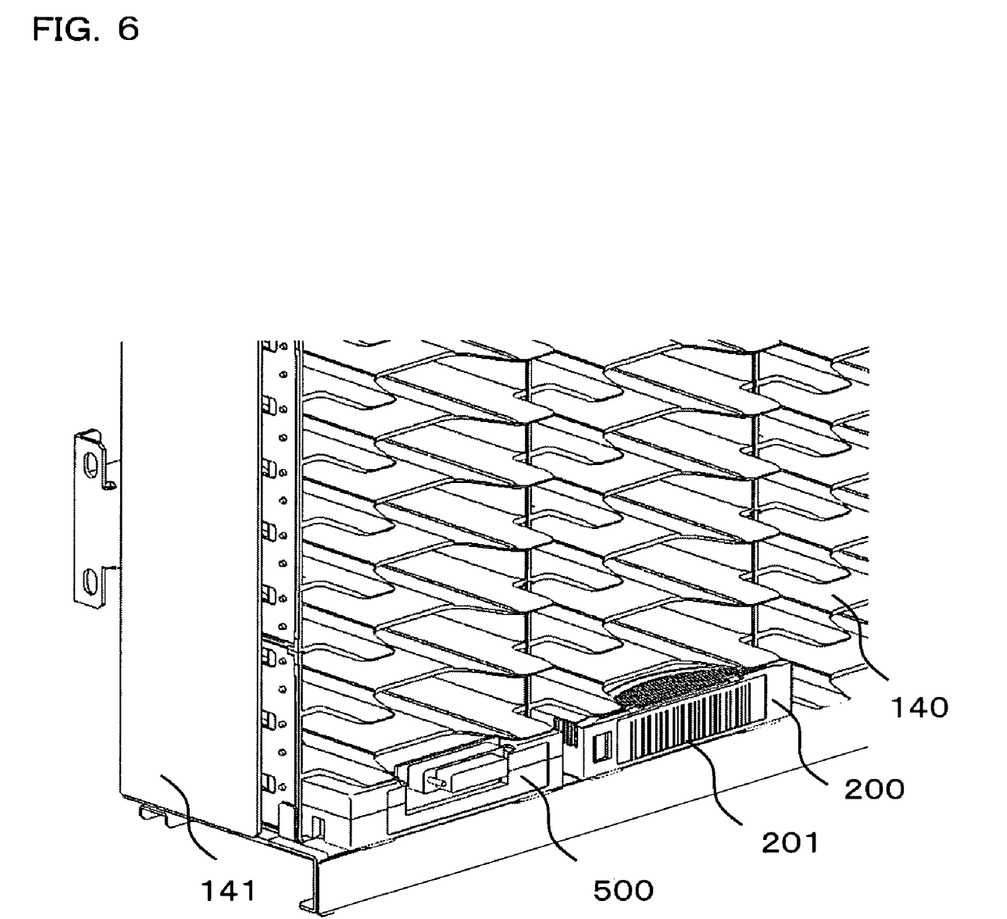
FIG. 6 shows an example of storage of the cartridge type sensor.

FIG. 6 shows the cartridge type sensor 500 stored in a cell 140 and a recording medium 200 stored in another cell 140.

The cartridge type sensor 500 is stored in the left lowermost cell 140 such that the first connector 520 is exposed. When the picker 410 of the hand 400 picks up the cartridge type sensor 500 and the hand 400 draws it therein, the first connector 520 engages with the second connector 420, thus resulting in electrical connection between the hand 400 and the cartridge type sensor 500. The recording medium 200 is stored such that a barcode 201 applied thereon is exposed. The hand 400 holding the cartridge type sensor 500 moves to a storage position in front of the recording medium 200 held in the cell 140. The optical reader 530 then reads the barcode 201, serving as a recording-medium identification code. Alternatively, the medium detector 540 detects the presence or absence of the recording medium 200. A flag 210 is not shown in FIG. 6. For instance, when a flag 210 as shown in FIG. 12 is applied on each cartridge, the optical reader 530 can similarly read the flag 210.

Figure 7:
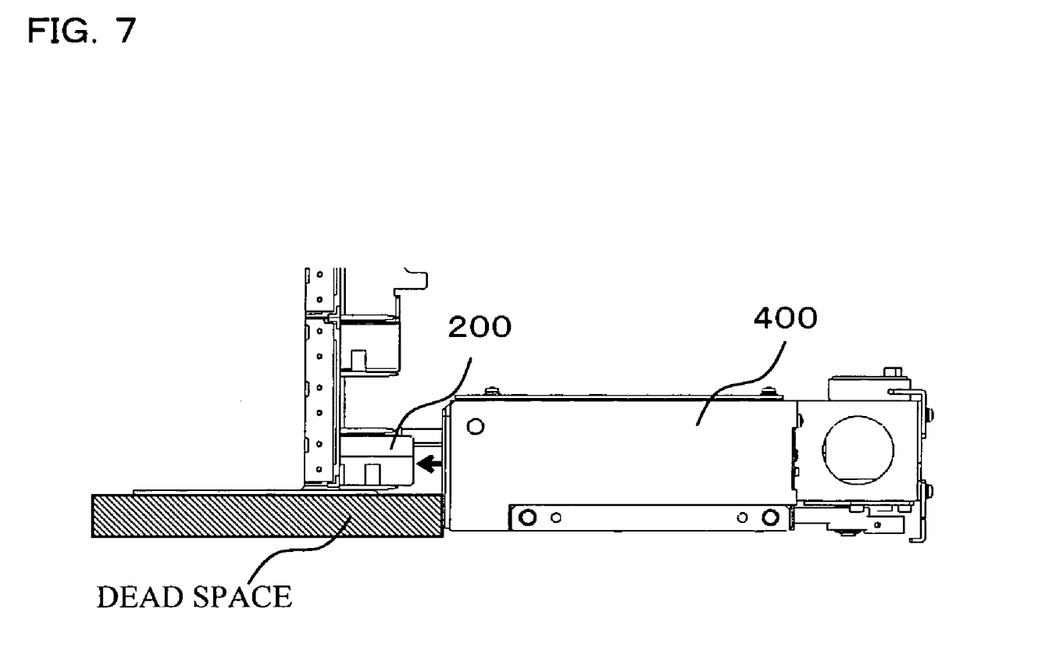
FIG. 7 is a diagram explaining a dead space in the library apparatus according to the embodiment of the present invention.

With the above-described arrangement, as shown in FIG. 7, a dead space under the lowermost cells 140 can be smaller than that in FIG. 13.

What is claimed is:

1. A library apparatus for storage of recording media in cells, each recording medium housed in a first cartridge in the cell, the apparatus comprising:
   a controller for robot control;
   a cartridge type sensor stored in the cell, said cartridge type sensor including:
     an optical reader for reading a medium identification code;
     a medium detector for detecting a presence/absence of the recording medium in the cell;
     a second cartridge having the same shape as the first cartridge of each recording medium to be stored in the cell, said second cartridge arranging both of the optical reader and the medium detector;
     a first connector electrically connected to the optical reader and the medium detector; and
     pairs of rollers arranged in the second cartridge such that each pair of rollers respectively protrude from respective faces opposite to associated first reference faces to a predetermined extent, each pair of rollers being movably pressed by elastic members arranged inside the second cartridge, said first reference faces serving as the top or bottom and the left or right side of the second cartridge; and
   a robot operating to pick up the cartridge type sensor from the cell and position the cartridge type sensor at a location indicated by the controller while holding the cartridge type sensor on the basis of an instruction from the controller, the robot including a hand, said hand including:
     a picker for picking up the cartridge type sensor;
     a second connector capable of engaging with the first connector; and
     a holding mechanism including second reference faces that are in contact with the respective first reference faces while the surfaces of the rollers press against the inner surfaces of the top or bottom and the left or right sides of the hand.

* * * * *